US007610680B2

(12) United States Patent
Vitello et al.

(10) Patent No.: US 7,610,680 B2
(45) Date of Patent: Nov. 3, 2009

(54) METHODS FOR CREATING CHANNELS

(75) Inventors: Christopher Vitello, Corvallis, OR (US); Steven Lunceford, Corvallis, OR (US); Paul Nash, Monmouth, OR (US); Marc A. Baldwin, Corvallis, OR (US); Karen St Martin, Lebanon, OR (US); Mark A. Smith, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/857,276

(22) Filed: Sep. 18, 2007

(65) Prior Publication Data

US 2008/0012180 A1 Jan. 17, 2008

Related U.S. Application Data

(62) Division of application No. 10/657,624, filed on Sep. 8, 2003, now Pat. No. 7,299,552.

(51) Int. Cl.
*B23P 17/00* (2006.01)
*B29C 35/08* (2006.01)

(52) U.S. Cl. ....................... 29/890.1; 29/25.35; 29/613; 29/832; 29/831; 29/825; 264/402

(58) Field of Classification Search ................ 29/890.1, 29/25.35, 613, 825; 347/54, 68, 72, 47; 264/510, 264/316, 402, 227; 216/27
See application file for complete search history.

(56) References Cited

U.S. PATENT DOCUMENTS

| | | | | |
|---|---|---|---|---|
| 4,112,436 | A * | 9/1978 | Cone | 347/47 |
| 4,429,322 | A * | 1/1984 | Dressler et al. | 347/47 |
| 4,583,272 | A * | 4/1986 | Keller | 492/53 |
| 4,660,801 | A | 4/1987 | Schad | |
| 5,089,186 | A | 2/1992 | Moore et al. | |
| 5,694,684 | A | 12/1997 | Yamamoto | |
| 5,921,312 | A | 7/1999 | Carden | |
| 5,955,143 | A | 9/1999 | Wheatley et al. | |
| 6,120,131 | A | 9/2000 | Murthy et al. | |
| 6,149,430 | A | 11/2000 | Nemetz et al. | |
| 6,247,792 | B1 | 6/2001 | Silverbrook | |
| 6,394,094 | B1 | 5/2002 | McKenna et al. | |
| 6,616,885 | B2 | 9/2003 | Lombardi et al. | |

* cited by examiner

*Primary Examiner*—Derris H Banks
*Assistant Examiner*—Tai Nguyen

(57) ABSTRACT

Methods of creating an internal channel of a fluid-ejection device are provided. One method includes encapsulating a channel core in an element of the fluid-ejection device that corresponds to the internal channel and dissolving at least a portion of the channel core.

21 Claims, 20 Drawing Sheets

METHODS FOR CREATING CHANNELS

CROSS REFERENCE TO RELATED APPLICATIONS

This is a division of application Ser. No. 10/657,624 filed Sep. 8, 2003 now U.S. Pat. No. 7,299,552, titled Methods For Creating Channels. Priority is claimed under 35 U.S.C. §§ 120 and 121.

BACKGROUND

Many fluid-ejection and fluid handling devices have internal channels for carrying fluids. A print head, e.g., of an ink-jet cartridge, an ink-deposition system, or the like, is an example of a fluid-ejection device that typically incorporates internal channels for delivering ink from a reservoir to a fluid-ejecting substrate, e.g., a print die, for deposition on a printable medium, such as paper. Joining components so that grooves in one component mate with corresponding grooves in another component to create internal channels within the joined components forms internal channels for many fluid-ejection devices. However, the corresponding grooves are often difficult to align, especially for complex channel patterns and/or a large number of channels. Moreover, it is difficult to obtain internal channels that do not leak, and extensive leak testing is often required.

Ultrasonic welding is one method of joining the components, but variations in material, part geometry, welder horns, and energy output devices often create unacceptable weld joints. Solvent and adhesive bonding is another way to join the components. However, solvents and adhesives are often difficult to apply, especially for complex channel patterns and/or a large number of channels. Moreover, various joining processes often produce particles that can result in a defective assembly.

SUMMARY

One embodiment of the present invention provides a method of creating an internal channel of a fluid-ejection or fluid handling device. The method includes encapsulating a channel core in an element of the fluid-ejection device that corresponds to the internal channel and dissolving at least a portion of the channel core.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
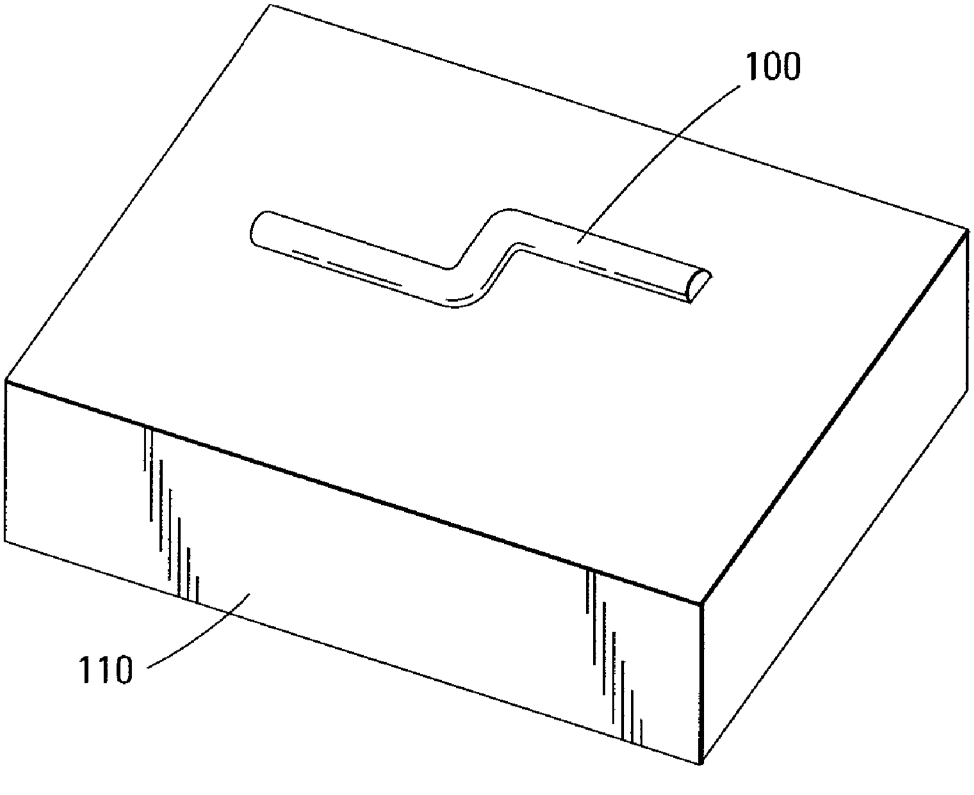
FIG. 1 is a perspective view illustrating a channel core formed in a mold according to an embodiment of the present invention.
Figure 2:
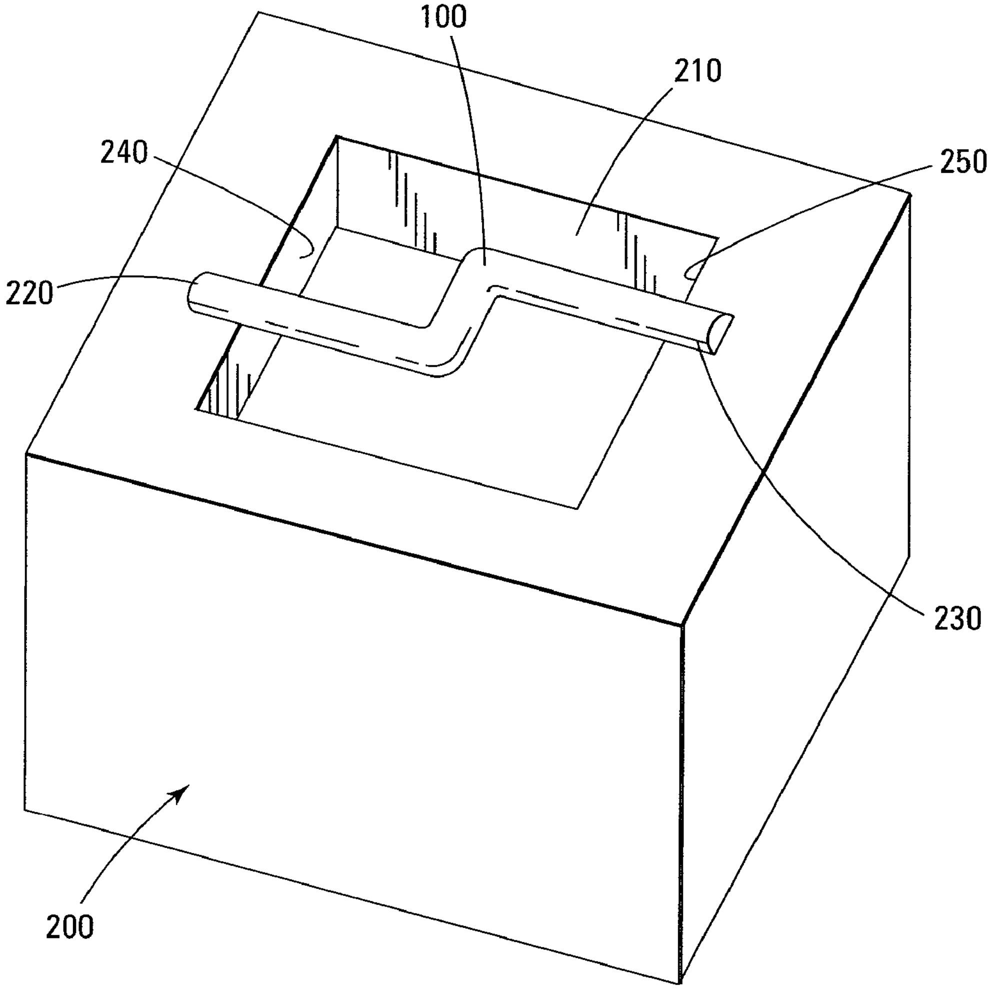
FIG. 2 is a perspective view illustrating a channel core disposed over a mold cavity prior encapsulation according to another embodiment of the present invention.
Figure 3:
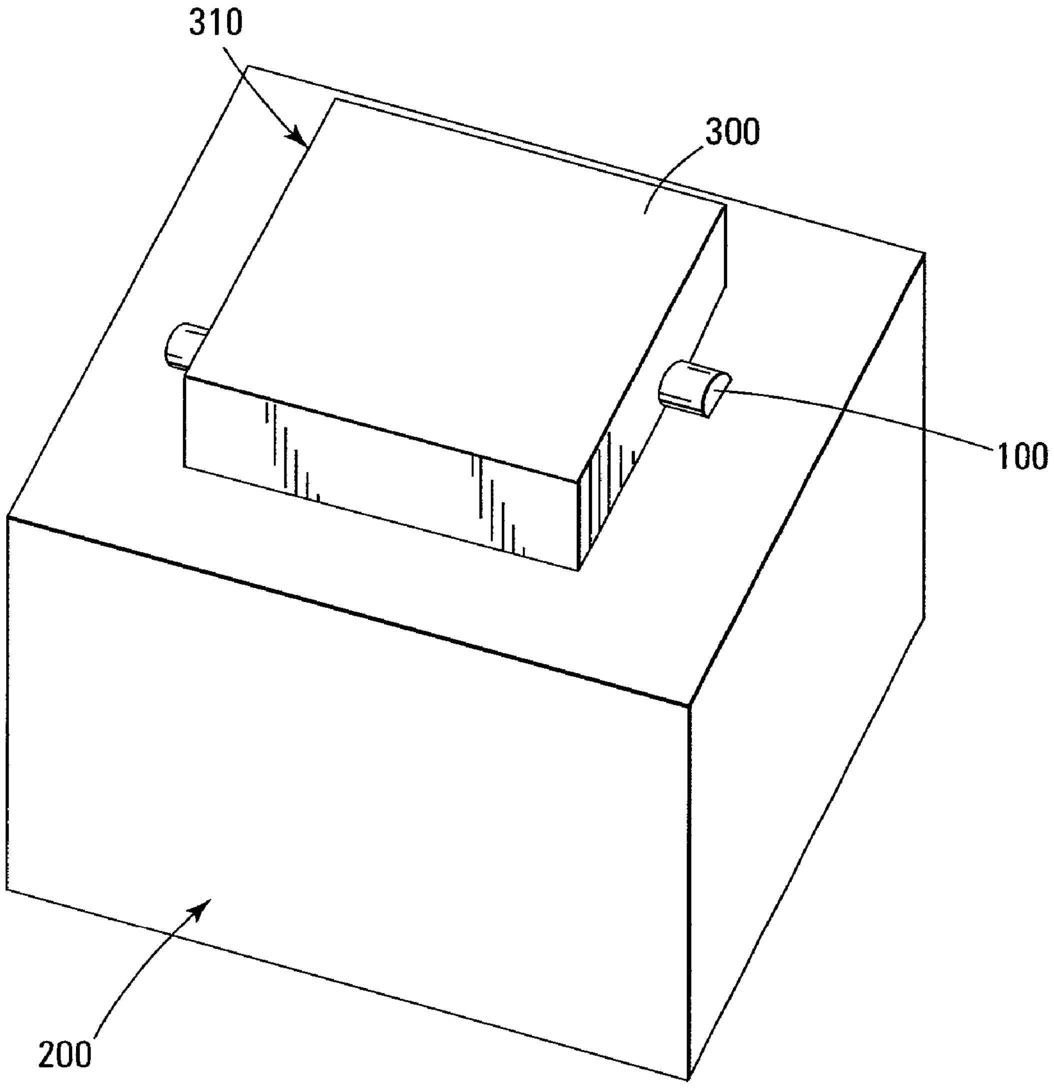
FIG. 3 is a perspective view illustrating encapsulating the channel core of FIG. 2 with an element using the mold of FIG. 2 according to yet another embodiment of the present invention.

FIGS. 1-6 illustrate formation of an internal channel, e.g., during the manufacture of a manifold, a fluid-ejection device, such as a print head, etc., according to an embodiment of the present invention. FIG. 1 illustrates formation of a sacrificial channel core 100. For one embodiment, channel core 100 is of a water-soluble polymer, such as polyvinyl alcohol, polyethylene oxide, or the like. Channel core 100 may be formed using any technique, such as, for example, injection molding, forming, stamping, or machining. As shown in FIG. 1, channel core 100 may be formed from injection molding using a mold 110, half of which is shown in FIG. 1. Channel core 100 is then positioned in a mold 200, a first half of which is shown in FIG. 2. In one embodiment, channel core 100 bridges a cavity 210 of mold 200 so that ends 220 and 230 respectively extend past walls 240 and 250 of cavity 210. A second half (not shown) of mold 200 is positioned on the first half of mold 200. A material 300, shown in FIG. 3, is molded around channel core 100 by injecting material 300 into mold 200 in a molten state so as to fill cavity 210 and encapsulate (or overmold) channel core 100. This forms an element 310 with channel core 100. Material 300 can be a plastic, an elastomer, etc.

Figure 4:
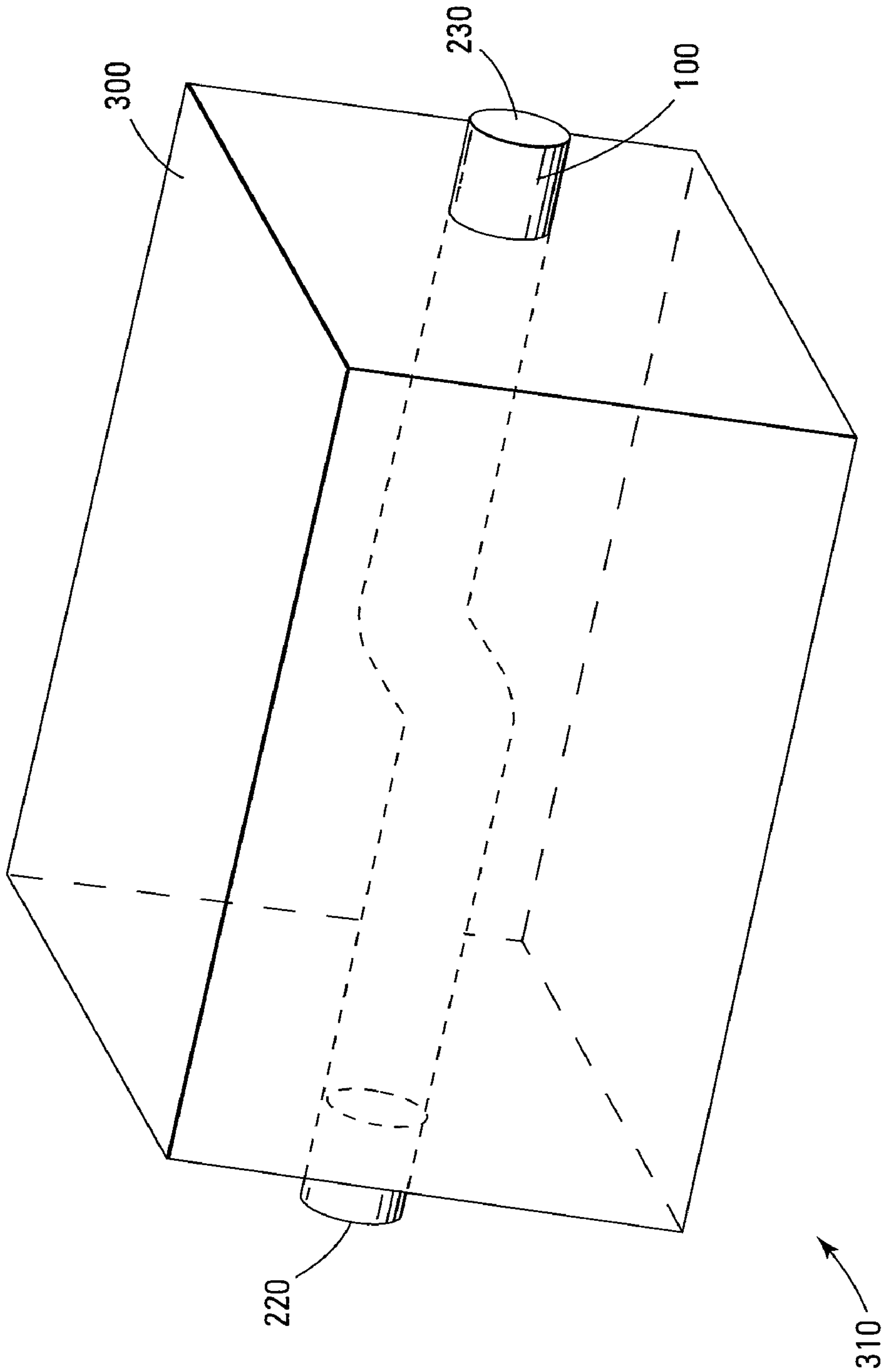
FIG. 4 is a perspective view illustrating the element of FIG. 3 encapsulating the channel core of FIG. 3 after removal from the mold of FIG. 2 according to another embodiment of the present invention.

After material 300 solidifies around channel core 100, element 310 is removed from mold 200. FIG. 4 illustrates element 310 with channel core 100 therein after removal from mold 200. After removal from mold 200, element 310 is exposed to a solvent, such as water for embodiments where channel core 100 is of a water-soluble polymer, for dissolving channel core 100 from element 310. This may include immersing element 310 in a solvent bath until channel core 100 is dissolved. For some embodiments, increasing the solvent temperature, directing jets of solvent onto element 310, and/or agitating the solvent bath act to reduce a time required for dissolving channel core 100. For other embodiments, a buffer is added to the solvent bath to reduce the time required for dissolving channel core 100. For one embodiment, the buffer is added to a water solvent to produce an aqueous solvent having a pH of about 4. For another embodiment, ends 220 and 230 of channel core 100 are alternately exposed to solvent flow.

Figure 5:
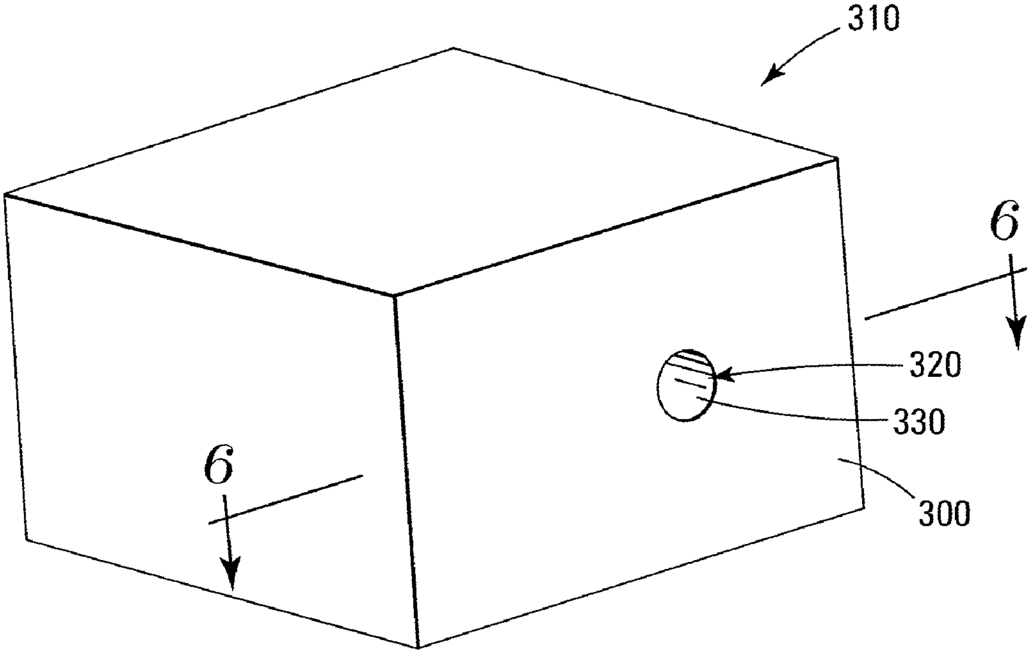
FIG. 5 is a perspective view illustrating a channel in the element of FIG. 4 formed by removing the channel core according to another embodiment of the present invention.
Figure 6:
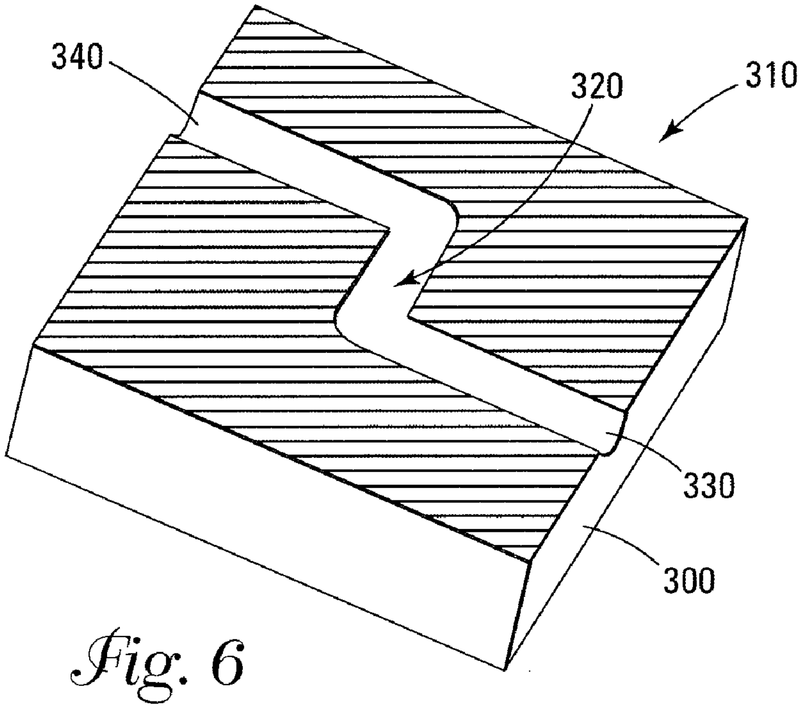
FIG. 6 is a view taken along line 6-6 of FIG. 5.

FIG. 5 illustrates element 310 after channel core 100 is dissolved therefrom according to another embodiment of the present invention. Dissolution of channel core 100 creates a flow-through internal channel 320 in element 310 that is open at ends 330 and 340 thereof, as shown in FIG. 5. FIG. 6 is a cross-sectional view of element 310 illustrating a cross section of channel 320. For one embodiment, element 310 is a manifold of a fluid-ejection device, such as a print head.

Figure 7:
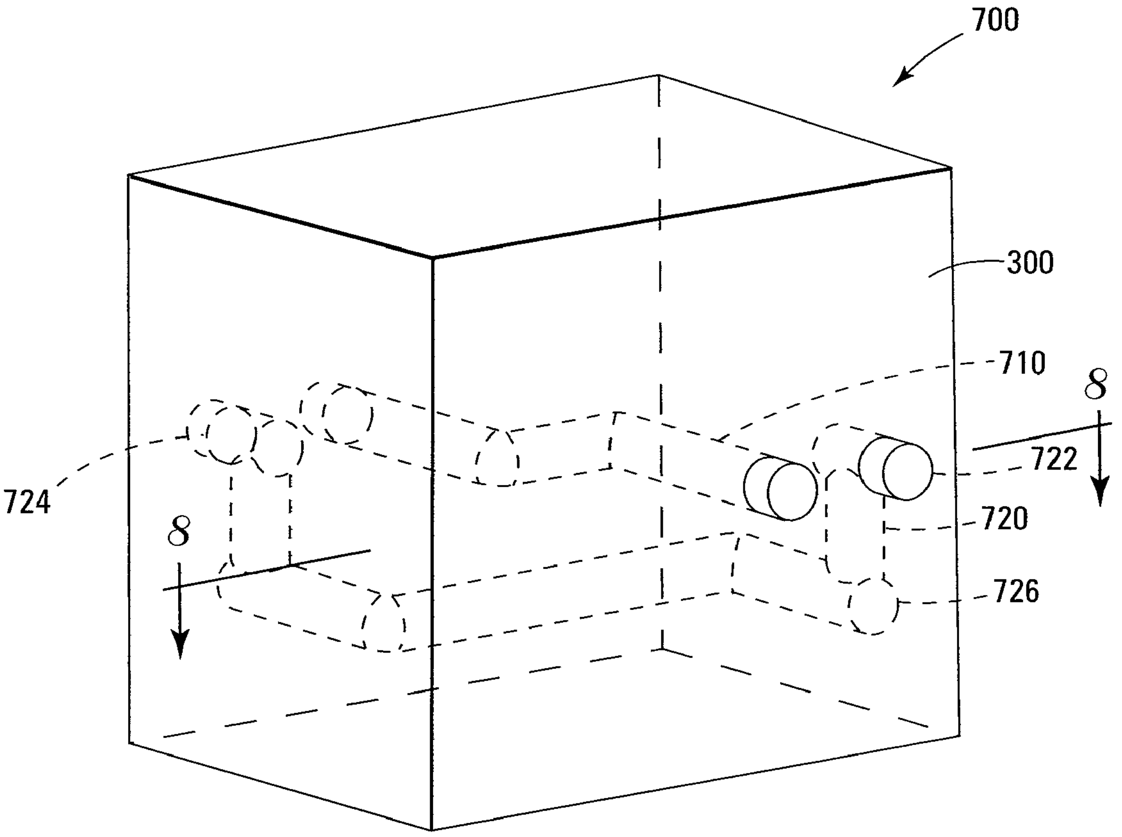
FIG. 7 is a perspective view illustrating channel cores encapsulated by an element according to another embodiment of the present invention.

FIG. 7 illustrates an element 700, such as a manifold of a fluid-ejection device, e.g., a print head, that includes channel cores 710 and 720 encapsulated by material 300 according to another embodiment of the present invention. For one embodiment, channel cores 710 and 720 are as described above and are formed as described above for channel core 100 of FIG. 1. For another embodiment, element 700 and is formed as described above for element 310 of FIG. 4.

Figure 8:
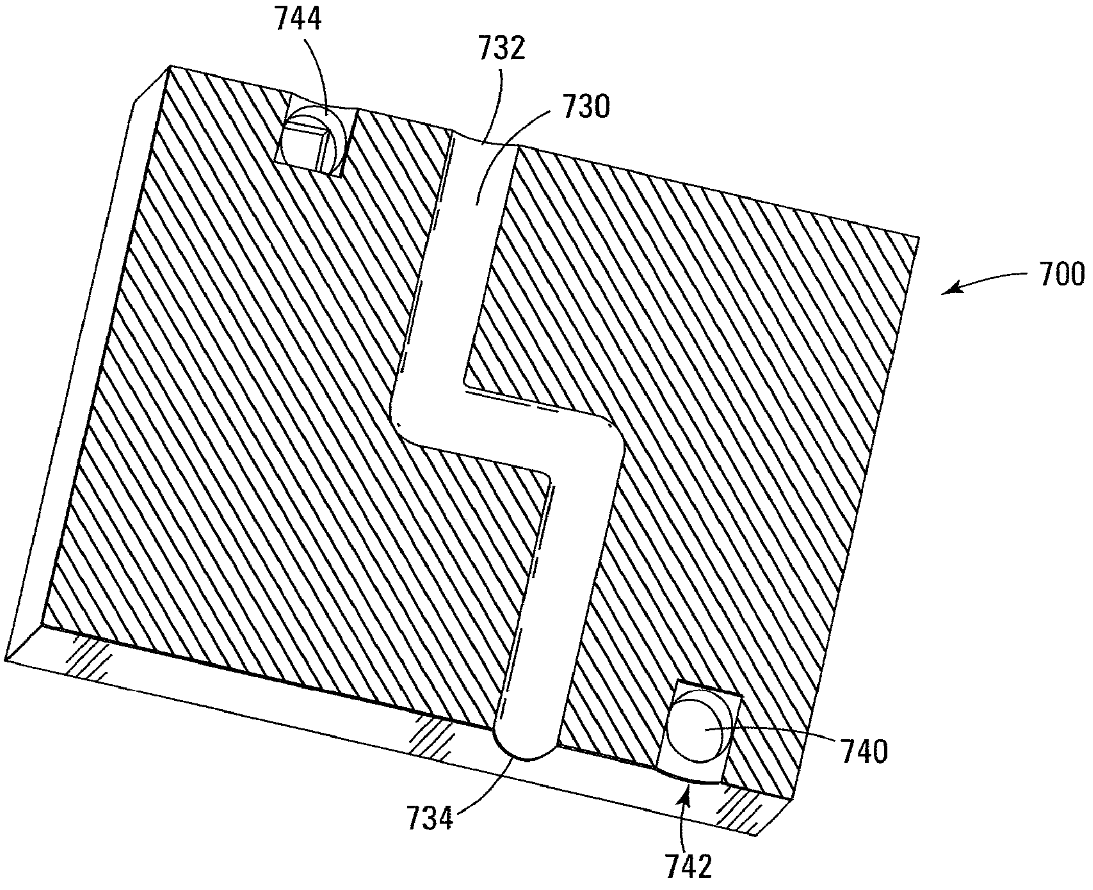
FIG. 8 is a cross-sectional view of the element of FIG. 7 taken along line 8-8 of FIG. 7 illustrating channels formed by removing the channel cores according to yet another embodiment of the present invention.

FIG. 8 is a cross-sectional view of element 700 after dissolving channel cores 710 and 720 therefrom, as described above. FIG. 8 illustrates a cross section of a through-flow channel 730 that is open at ends 732 and 734 thereof and that is created by dissolving channel core 710. Dissolving channel core 720 creates a through-flow channel 740 that is open at ends 742 and 744 thereof, as shown in FIG. 8. For one embodiment, channel core segments 722 and 724 of channel core 720 are in a different plane than channel core segment 726 of channel core 720, as shown in FIG. 7. This means that channel 740 has segments that are in different planes, as shown in FIG. 8.

Figure 9:
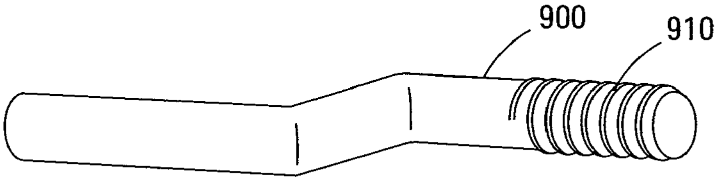
FIG. 9 is a perspective view illustrating a threaded channel core according to another embodiment of the present invention.
Figure 10:
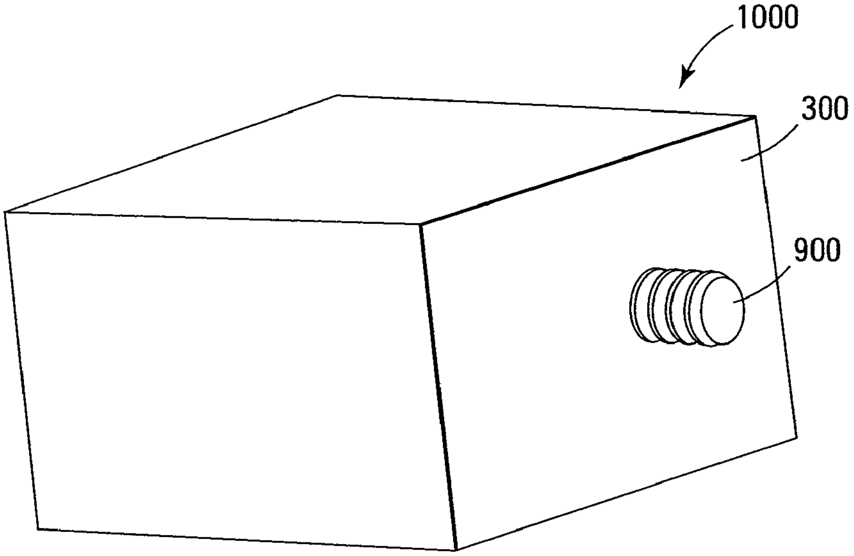
FIG. 10 is a perspective view illustrating an element encapsulating the threaded channel core of FIG. 9 according to yet another embodiment of the present invention.
Figure 11:
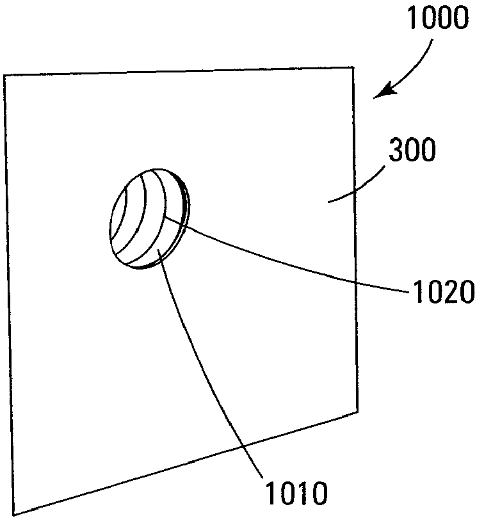
FIG. 11 is a perspective view illustrating an internally threaded channel in the element of FIG. 10 formed by removing the channel core.

FIGS. 9-11 illustrate formation of an internally threaded internal channel according to another embodiment of the present invention. FIG. 9 illustrates a channel core 900 having external threads 910. For one embodiment, injection molding, using a mold having internal threads for forming external threads 910, forms channel core 900. For another embodiment, channel core 900 is a water-soluble polymer. FIG. 10 illustrates an element 1000 that includes channel core 900 encapsulated by material 300 according to another embodiment of the present invention. For one embodiment, element 1000 is formed as described above for element 310 of FIG. 4. FIG. 11 illustrates element 1000 after channel core 900 has been dissolved therefrom, as described above, to form an internally threaded internal channel 1010. Note that external threads 910 of channel core 900 create internal threads 1020 of channel 1010. For one embodiment, element 1000 is manifold of a fluid ejection device, such as a print head.

Figure 12:
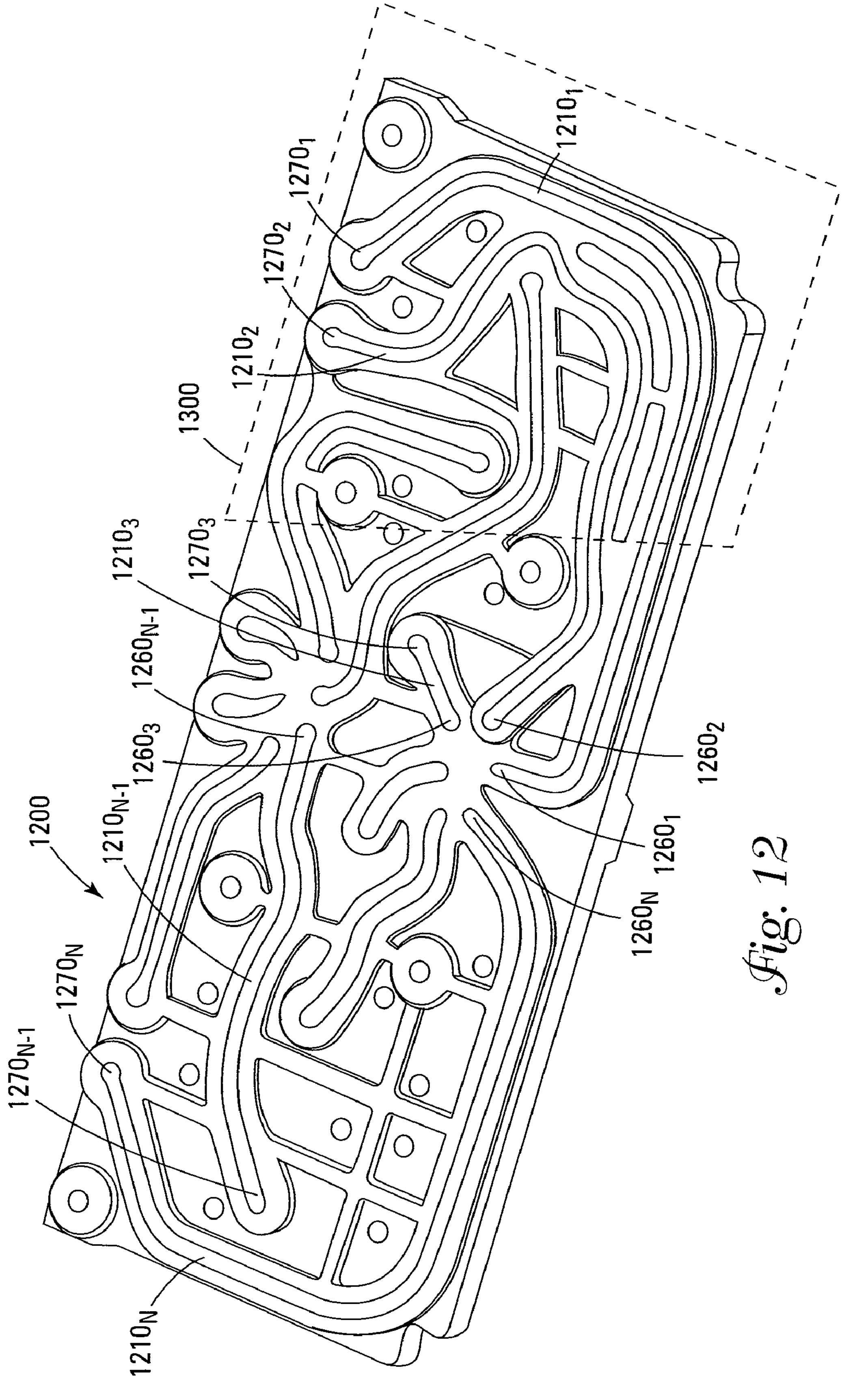
FIG. 12 is a perspective view illustrating a grooved component according to another embodiment of the present invention.
Figure 13:
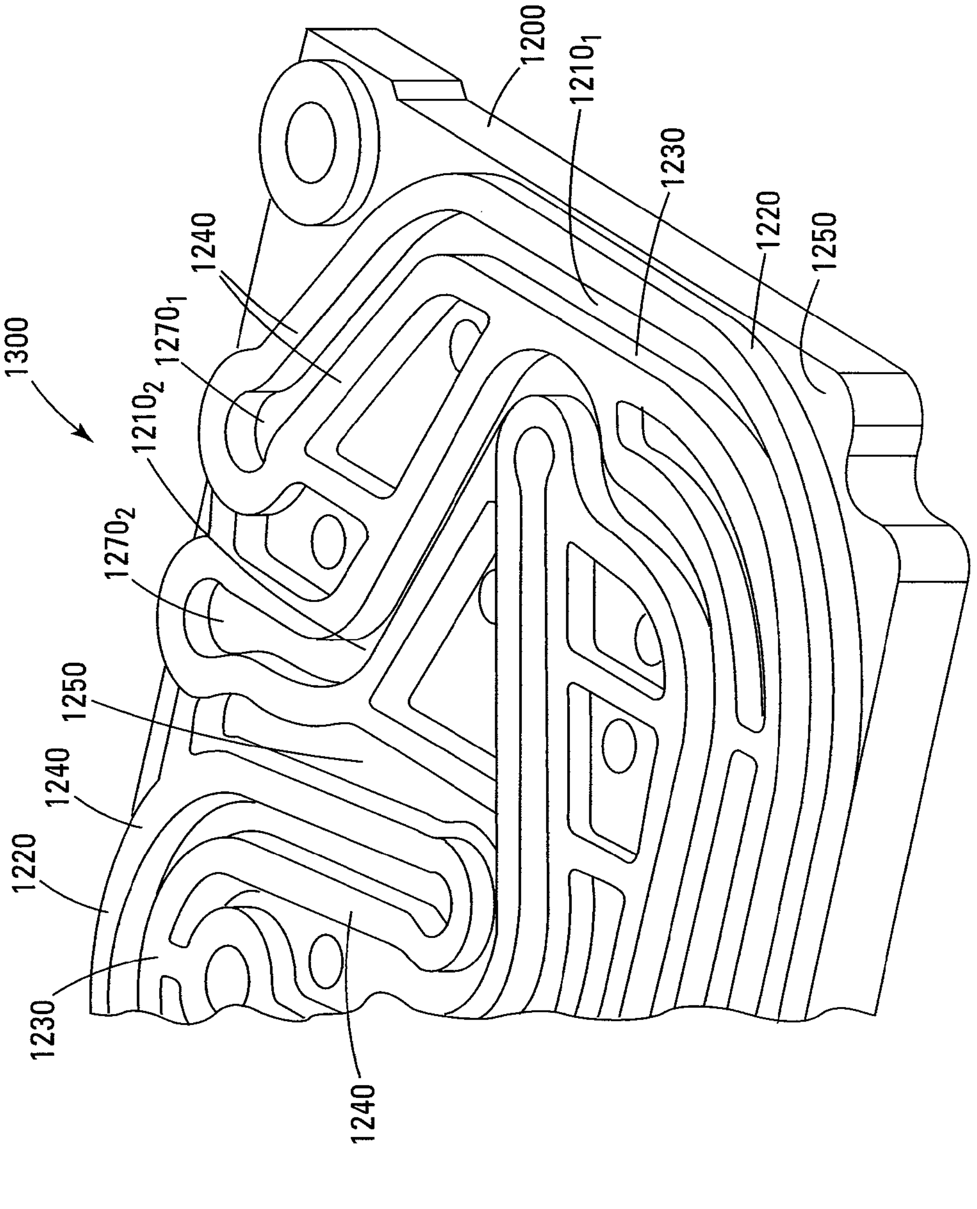
FIG. 13 is an enlarged view of region 1300 of FIG. 12.

FIGS. 12-15 illustrate formation of internal channels according to another embodiment of the present invention. FIG. 12 and FIG. 13, an enlarged view of region 1300 of FIG. 12, illustrate a component 1200 having grooves $\mathbf{1210}_1$ to $\mathbf{1210}_N$. For one embodiment, injection molding forms component 1200. That is, a material, e.g., plastic, an elastomer, etc., is injected into a mold patterned to create component 1200. For another embodiment, each of grooves $\mathbf{1210}_1$ to $\mathbf{1210}_N$ is located between ribs 1220 and 1230, as shown in FIG. 13. For another embodiment, ribs 1220 and 1230 protrude from a surface 1250 of component 1200 so that a surface 1240 of ribs 1220 and 1230 is above and is substantially parallel to surface 1250, as shown in FIG. 13.

For one embodiment, grooves $\mathbf{1210}_1$ to $\mathbf{1210}_N$ respectively intersect holes $\mathbf{1260}_1$ to $\mathbf{1260}_N$ at one end of the respective grooves, as shown in FIG. 12, that pass completely through component 1200 and that, for another embodiment, are substantially perpendicular to grooves $\mathbf{1210}_1$ to $\mathbf{1210}_N$. For other embodiments, grooves $\mathbf{1210}_1$ to $\mathbf{1210}_N$ respectively include end regions $\mathbf{1270}_1$ to $\mathbf{1270}_N$, as shown in FIGS. 12 and 13.

Figure 14:
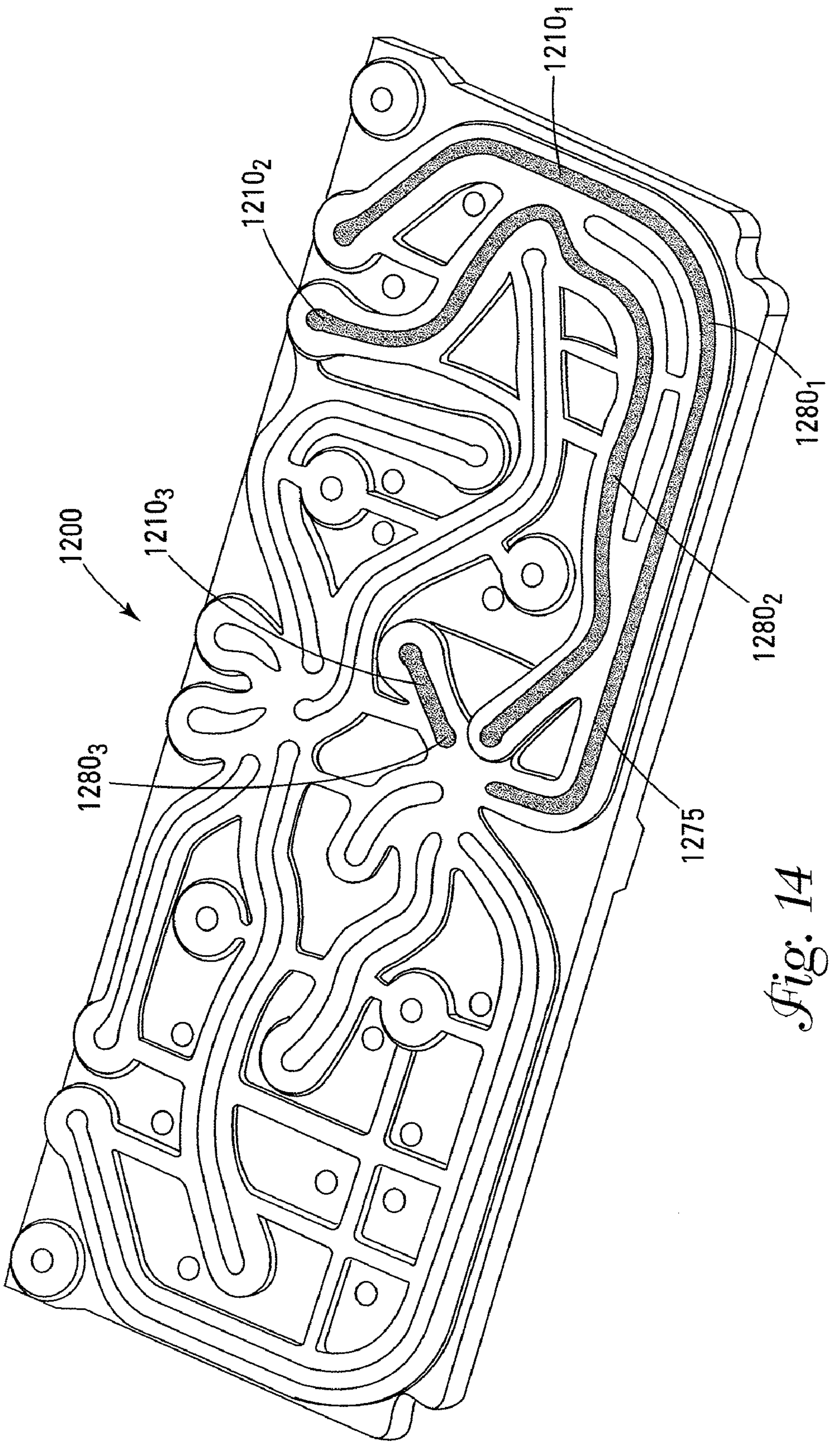
FIG. 14 is a perspective view that illustrates channel cores disposed in grooves of the component of FIG. 12 according to yet another embodiment of the present invention.

After the formation of component 1200, a material 1275 in a liquid state, e.g., a water-soluble polymer, such as polyvinyl alcohol, polyethylene oxide, or the like, is disposed in grooves 1210, as illustrated for grooves $\mathbf{1210}_1$ to $\mathbf{1210}_3$ in FIG. 14. Solidification of the material forms sacrificial channel cores in each of grooves 1210. As an example, FIG. 14 illustrates channel cores $\mathbf{1280}_1$ to $\mathbf{1280}_3$ respectively formed in grooves $\mathbf{1210}_1$ to $\mathbf{1210}_3$. For one embodiment, a plate (not shown) is disposed on component 1200 before disposing material 1275 in grooves 1210. Specifically, the plate is butted against surfaces 1240 of ribs 1220 and 1230. For one embodiment, material 1275 is injected into grooves 1210 through holes 1260 or through holes in the plate that align with grooves 1210.

Figure 15:
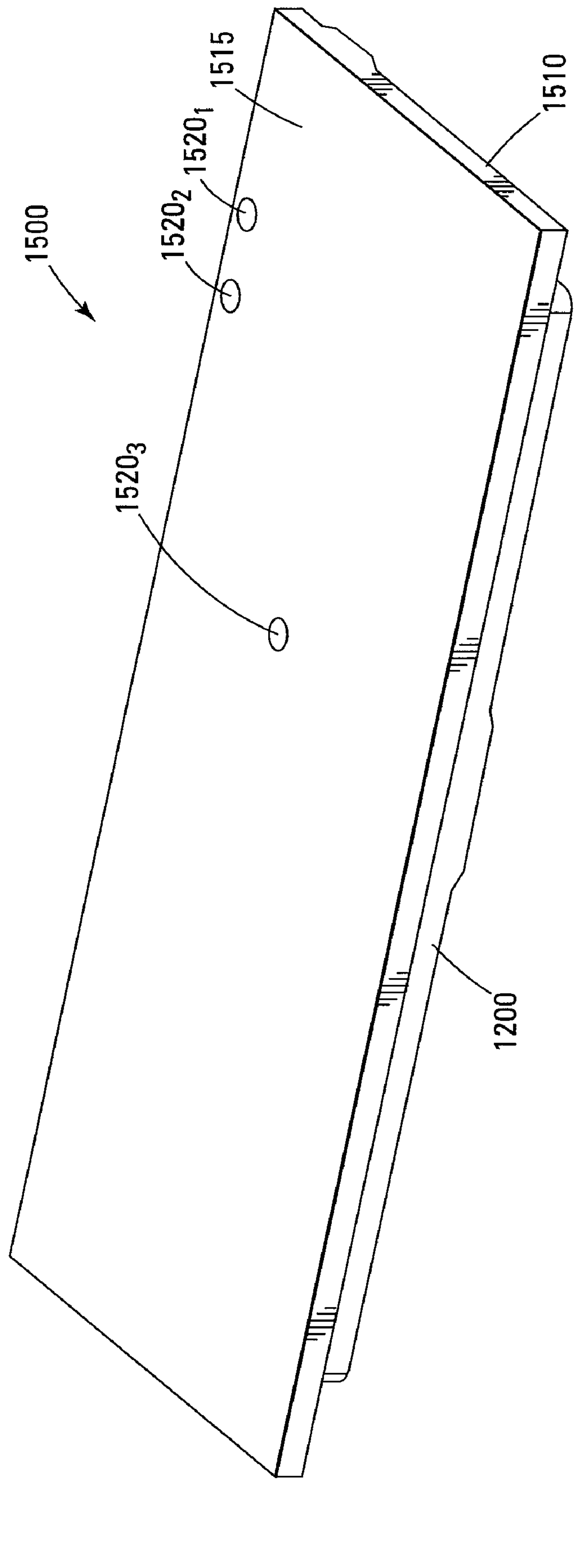
FIG. 15 is a perspective view illustrating an element formed by disposing a material on the component of FIG. 14 so as to cover the channel cores according to another embodiment of the present invention.

After forming the channel cores, an element 1500, shown in FIG. 15 is formed by disposing a material 1510, such as an elastomer, plastic, etc., on component 1200 so as to cover the channel cores. In this way, the channel cores are encapsulated by element 1500. For one embodiment, component 1200 is placed in a mold and material 1510 is injected in liquid form into the mold to dispose material 1510 on component 1200. For another embodiment, material 1510, in liquid form, is sprayed on component 1200 or spread on component 1200, e.g., using a spreading device, such as a spreader bar, a brush, etc.

Element 1500 is then exposed to a solvent, such as water for embodiments where the channel cores are of a water-soluble polymer, for dissolving the channel cores from grooves 1210 to create internal channels within element 1500 corresponding to grooves 1210. Exposing element 1500 to a solvent may include immersing element 1500 in a solvent bath until the channel cores are dissolved. For some embodiments, increasing the solvent temperature, directing jets of solvent onto element 1500, and/or agitating the solvent bath act to reduce a time required for dissolving the channel cores. For other embodiments, a buffer is added to the solvent bath to reduce the time required for dissolving the channel cores. For one embodiment, the buffer is added to a water solvent to produce an aqueous solvent having a pH of about 4.

For one embodiment, holes are formed in material 1510 that align with end regions 1270 of grooves 1210. For example, FIG. 15 illustrates holes $\mathbf{1520}_1$ to $\mathbf{1520}_3$ passing through a top surface 1515 of material 1510 (and thus of element 1500) that respectively align with end regions $\mathbf{1270}_1$ to $\mathbf{1270}_3$ respectively of grooves $\mathbf{1210}_1$ to $\mathbf{1210}_3$.

Figure 16A:
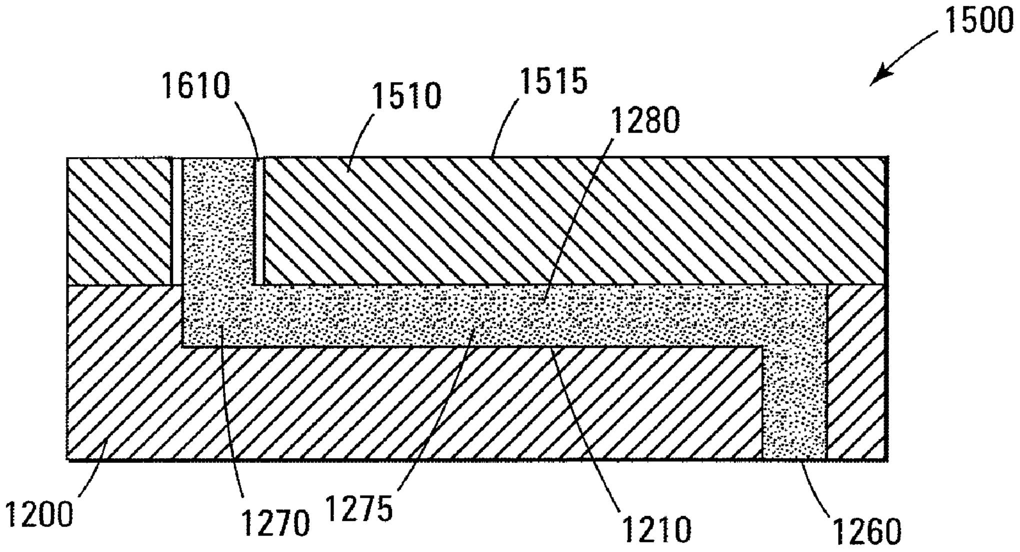
FIG. 16A is a cross-sectional view of the element of FIG. 15 before removal of the channel cores according to yet another embodiment of the present invention.
Figure 16B:
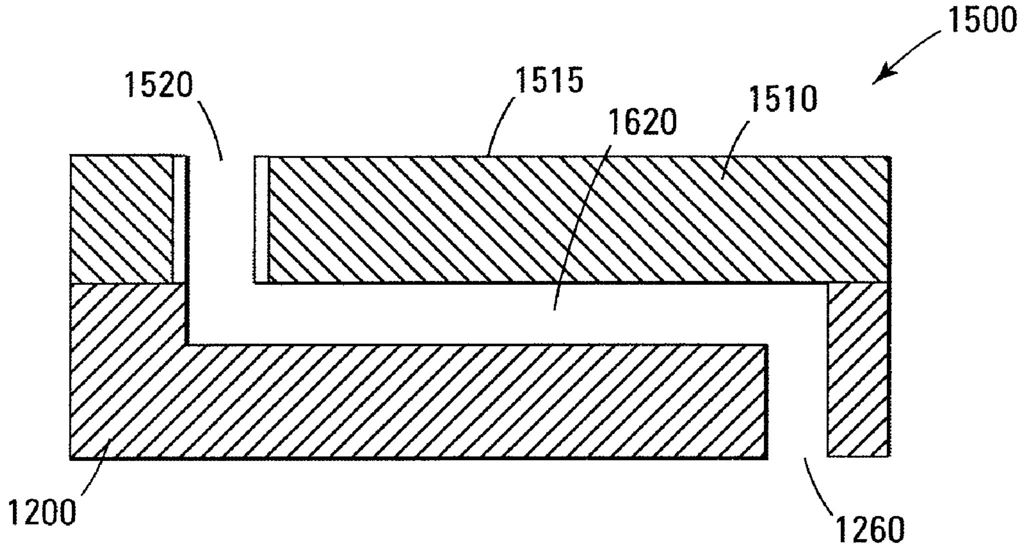
FIG. 16B is a cross-sectional view of the element of FIG. 15 after removal of the channel cores according to still another embodiment of the present invention.

For one embodiment, holes 1520 are formed as illustrated in FIGS. 16A and 16B, cross-sectional views of element 1500. In this embodiment, component 1200 is formed so that a conduit 1610 extends from each of the end regions 1270 of each of grooves 1210. A channel core 1280 is formed in conduit 1610, groove 1210, and hole 1260. Material 1275 is injected into conduit 1610, groove 1210, and hole 1260 through conduit 1610 or hole 1260, for example. Material 1510 is disposed on component 1200 and around conduit 1610 so that conduit 1610 passes completely through material 1510, as shown in FIG. 16A. Channel core 1280 is then dissolved, as described above, to form an internal channel 1620, corresponding to groove 1210, that interconnects hole 1260 and hole 1520, as shown in FIG. 16B. During dissolution of channel core 1280, the solvent accesses channel core 1280 through conduit 1610 and hole 1260. For some embodiments, conduit 1610 and hole 1260 are alternately exposed to a solvent flow. For one embodiment, holes 1260 and 1520 are respectively an outlet and inlet of channel 1620 and thus of element 1500 or vice versa.

Figure 16C:
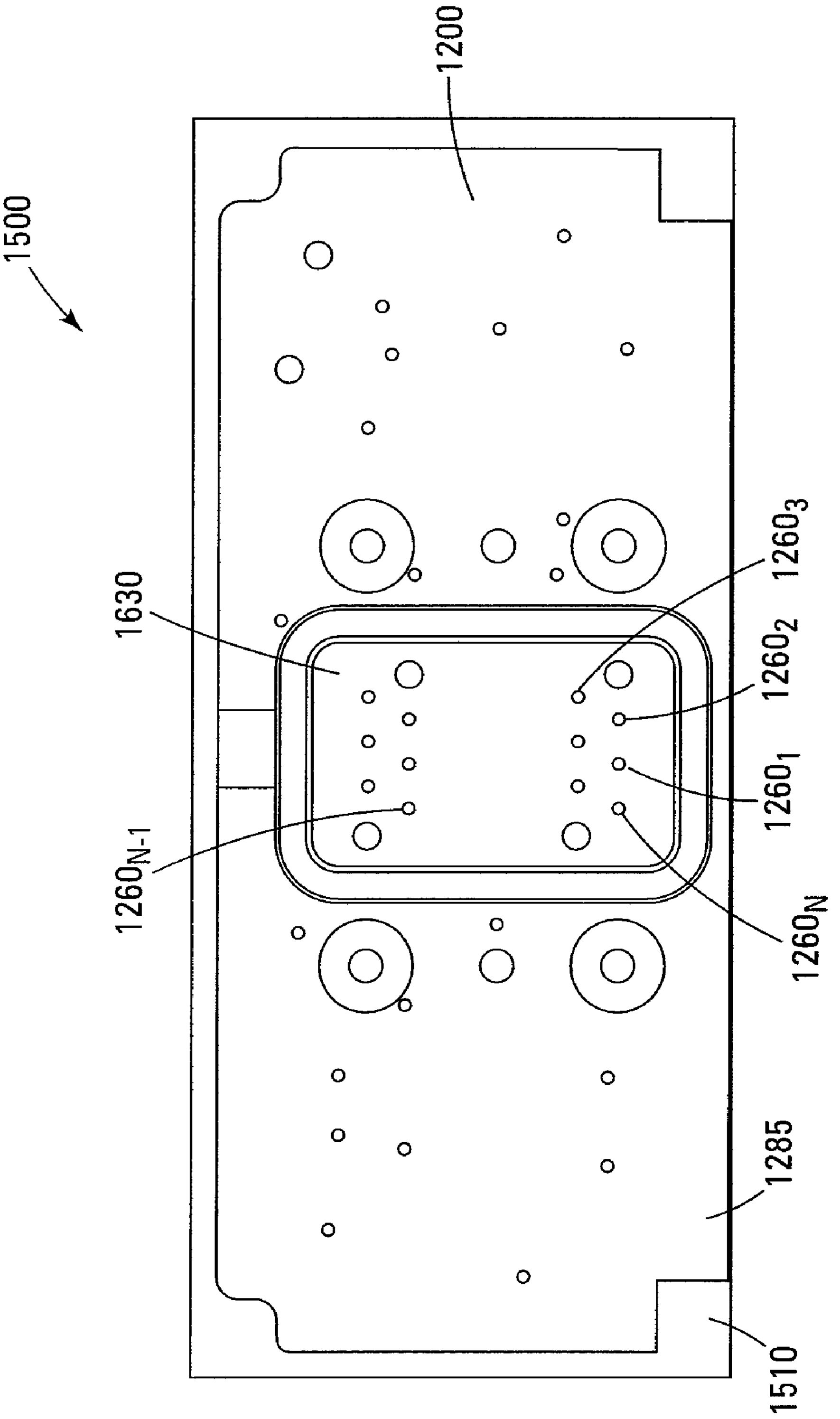
FIG. 16C is a bottom view of the element of FIG. 15.

FIG. 16C is a bottom view of element 1500. For one embodiment, the holes 1260 terminate at a bottom surface 1285 of component 1200 (and thus of element 1500), as shown in FIG. 16C. For one embodiment, element 1500 is a manifold of a fluid-ejection device, such as a print head. For another embodiment, holes 1260 lie within a region 1630 of bottom surface 1285. For some embodiments, a fluid-ejecting substrate, such as a print-head die (not shown) is disposed within region 1630 so that the fluid-ejecting substrate is fluidly coupled to the internal channels by holes 1260. For these embodiments, a fluid, such as ink, enters element 1500 through holes 1520, flows through channels 1620, exits element 1500 through holes 1260, and flows into the fluid-ejecting substrate.

Figure 17:
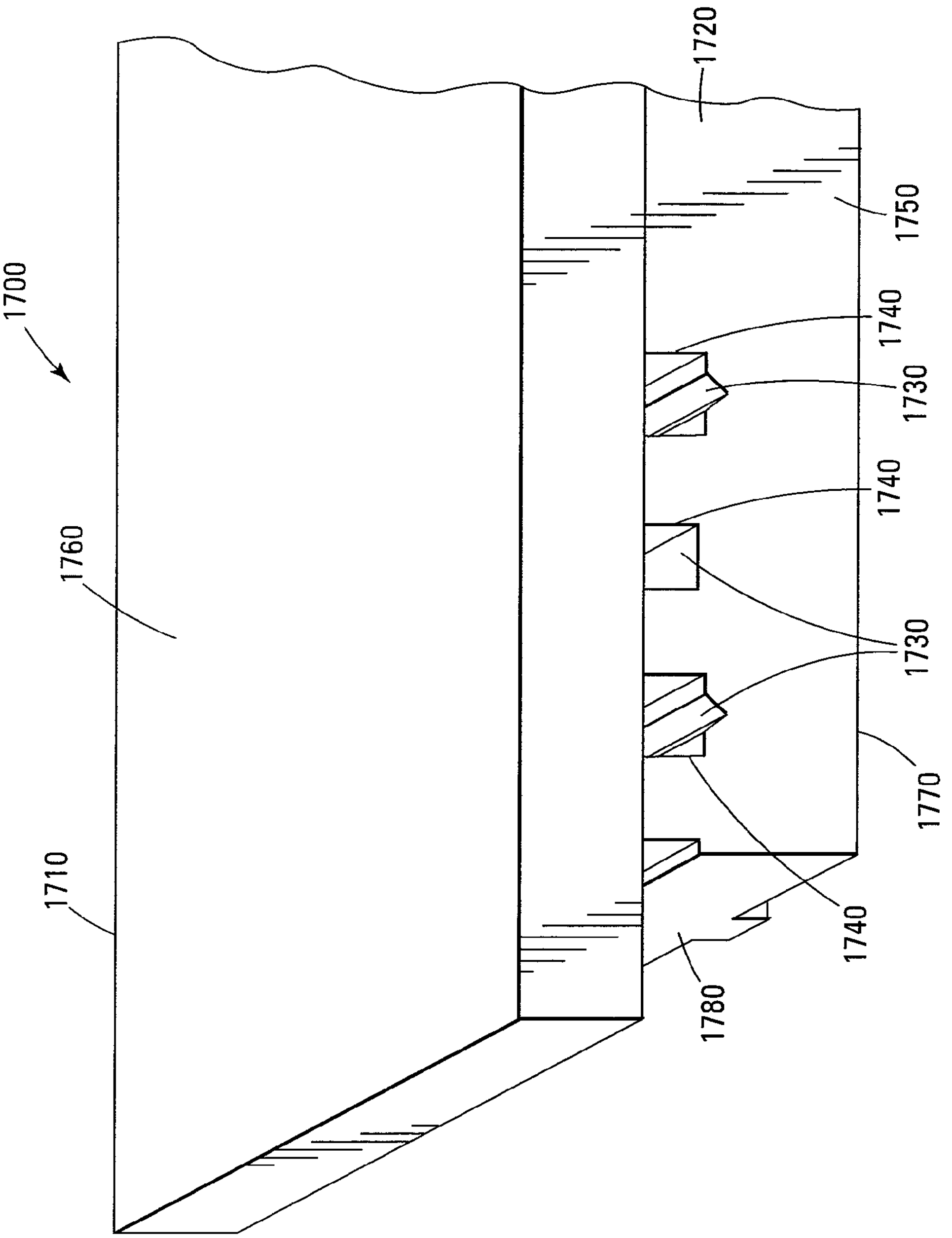
FIG. 17 illustrates an element according to another embodiment of the present invention.

FIG. 17 illustrates an element 1700 according to another embodiment of the present invention. Element 1700 includes a material 1710, such as plastic, an elestomer, etc., disposed on a component 1720. Element 1700 also includes internal channels 1730. For one embodiment, internal channels 1730 terminate at openings 1740 in a side 1750 of component 1720. For this embodiment, internal channels 1730 can connect openings 1740 to holes (not shown) passing through a top surface 1760 of material 1710, holes (not shown) passing through a bottom surface 1770 of component 1720, and/or other openings (not shown) in sidewall 1750, an end-wall 1780 of component 1720, a sidewall opposite sidewall 1750 and/or an end-wall opposite end-wall 1780.

For another embodiment, component 1720 having grooves corresponding to internal channels 1730 is formed by injection molding, as described above for component 1200. Sacrificial channel cores are then disposed in the grooves, as described above for component 1200. Material 1710 is then disposed on component 1720 so that element 1700 encapsulates the channel cores. The channel cores are dissolved, as described above for element 1500 to create internal channels 1730 corresponding to the grooves. For one embodiment, element 1700 is a manifold of a fluid-ejection device such as a print head.

Figure 18:
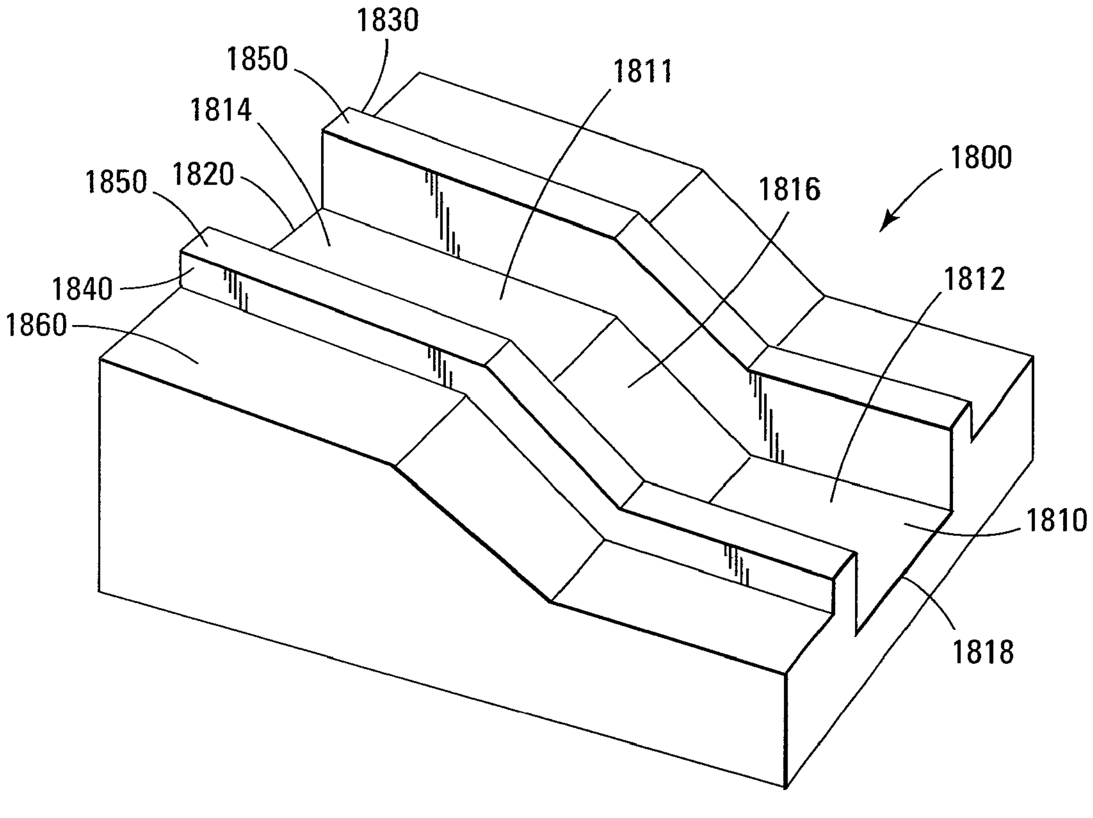
FIG. 18 is a perspective view illustrating a grooved component according to another embodiment of the present invention.

FIG. 18 illustrates a component 1800 having a groove 1810. For one embodiment, component 1800 is formed by injection molding, as described above for component 1200. Component 1800 can be plastic, an elastomer, etc. An internal surface 1811 of groove 1810 includes internal surfaces 1812 and 1814 that lie in different planes and that are interconnected, for one embodiment, by an inclined internal surface 1816. Therefore, ends 1818 and 1820 of groove 1810 are in different planes. For one embodiment, surfaces 1812 and 1814 are substantially parallel, and inclined surface 1816 forms at most a 45-degree angle with surfaces 1812 and 1814. For another embodiment, groove 1810 is located between ribs 1830 and 1840 protruding from a surface 1860 of component 1800. Each ribs 1830 and 1840 has a surface 1850 that substantially parallels internal surface 1811 of groove 1810. For other embodiments, surface 1860 of component 1800 substantially parallels internal surface 1811 of groove 1810.

Figure 19:
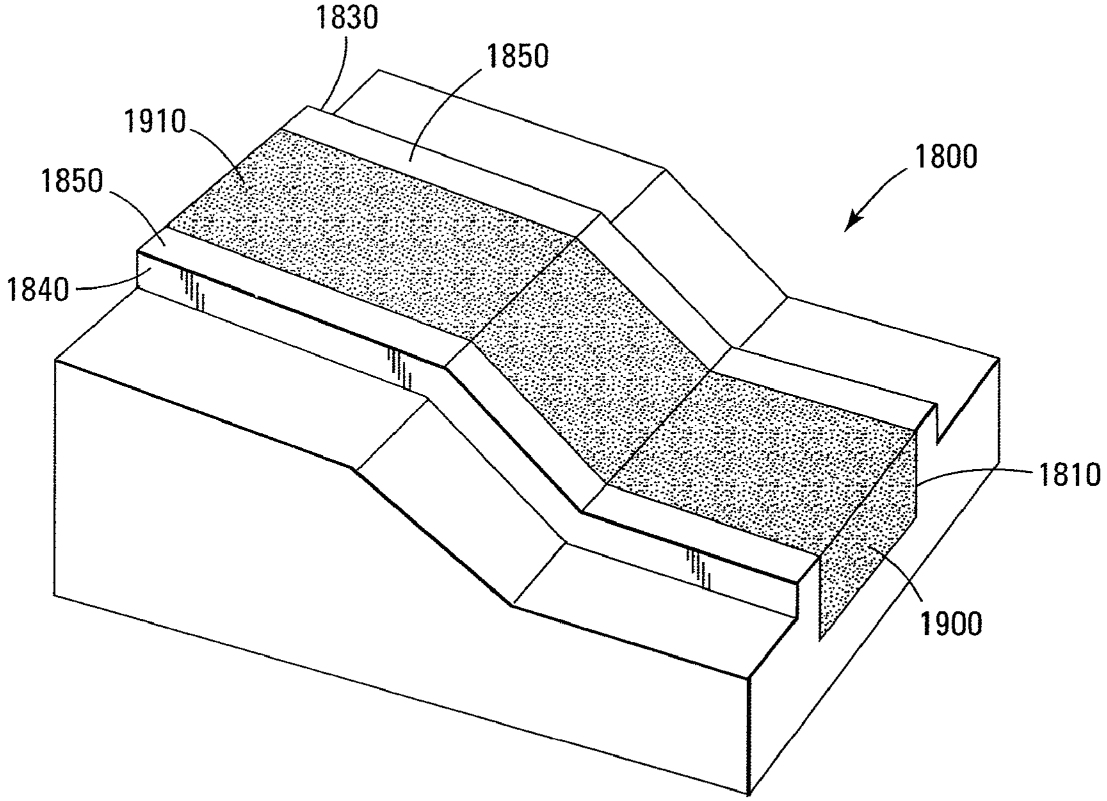
FIG. 19 is a perspective view that illustrates a channel core disposed in the groove of the component of FIG. 18 according to yet another embodiment of the present invention.

After the formation of component 1800, a material 1900 in a liquid state, e.g., a water-soluble polymer, such as polyvinyl alcohol, polyethylene oxide, or the like, is disposed in groove 1810, as illustrated in FIG. 19. Solidification of material 1900 forms a sacrificial channel core 1910 in groove 1810. For one embodiment, a plate (not shown) that fits the shape of surface 1850 of each of ribs 1830 and 1840 is butted against surface 1850 of each of ribs 1830 and 1840, and material 1900 is injected into groove 1810, e.g., through ends 1818 and/or 1820 (shown in FIG. 18) of groove 1810 and/or through holes in the plate that align with groove 1810.

Figure 20:
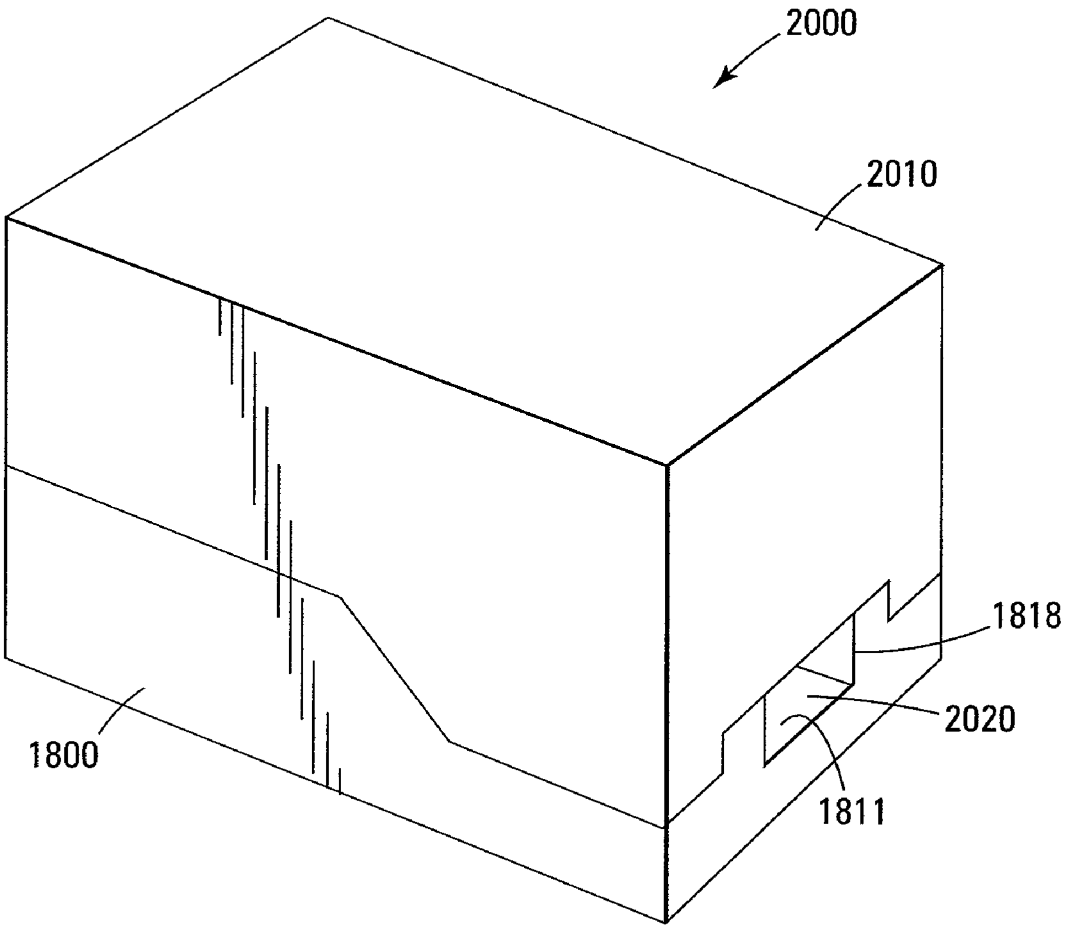
FIG. 20 is a perspective view illustrating an element having an internal channel according to another embodiment of the present invention.

After forming channel core 1910, an element 2000, shown in FIG. 20, is formed by disposing a material 2010, such as an elastomer, plastic, etc., on component 1800 so as to cover channel core 1910 so that element 2000 encapsulates channel core 1910. For one embodiment, element 2000 is placed in a mold and material 2010 is injected in liquid form into the mold to dispose material 2010 on component 1800. For another embodiment, material 2010, in liquid form, is sprayed on component 1800 or spread on component 1800, e.g., using a spreading device, such as a spreader bar, a brush, etc. Channel core 1910 is then dissolved, as described above for element 1500, to form an internal channel 2020 corresponding to groove 1810 within element 2000.

Note that end 1818 of groove 1810 corresponds to an opening in element 2000, as shown in FIG. 20, that can be used, for example, as an inlet of internal channel 2020. End 1820 of groove 1810 also corresponds to an opening in element 2000 (not shown) that can be used, for example, as an outlet of internal channel 2020. Note that the inlet and outlet of internal channel 2020 respectively corresponding to ends 1818 and 1820 of groove 1810 are located in different planes of element 2000, because ends 1818 and 1820 are located in different planes of component 1800. For one embodiment, element 2000 is a manifold of a fluid-ejection device, such as a print head.

For some embodiments, the channel cores of the present invention are of composite materials including particles, e.g., insoluble particles, such as glass, etc., dispersed in a soluble material, e.g., water-soluble polymer. This reduces the amount of soluble material that needs to be dissolved when removing the channel cores. To remove a channel core, for one embodiment, the soluble material is dissolved, leaving the particles within the channel. The particles are then washed from the channel, for example, using a flow of the solvent.

For some embodiments, in order to facilitate or promote the removal of one or more channel cores, energy, such as infrared, laser, ultrasonic energy, or the like, is selectively directed at the core, or at various parts of the core, while the encapsulated core is in the water bath. For other embodiments, the material encapsulating the channel core is a transmissive material, e.g., clear polypropylene, and allows the energy to pass through the encapsulating material and into the channel cores without substantially heating the encapsulating material. For example, the energy excites the core so that the core generates heat and thereby attains a temperature that is greater than the temperature attained by the encapsulating material. For some embodiments, the channel core is an energy absorptive material, such as a water-soluble polymer, e.g., polyvinyl alcohol, polyethylene oxide, etc., having pigments, such as carbon black, added thereto. The energy directed at the core acts to excite the core, resulting in heating of the core. Heating acts to improve solubility and can reduce the viscosity of the core material laden solvent adjacent the core.

For another embodiment, the channel core is not dissolved from the encapsulating material. Instead the energy directed at the core by the above methods melts the core from the encapsulating material. For this embodiment, the energy passes through the transmissive encapsulating material without substantially heating the encapsulating material and is absorbed by the energy-absorbing core. For example, the energy excites the core so that the core generates heat and thereby attains a temperature that is greater than the temperature attained by the encapsulating material, causing the core to melt. For some embodiments, the encapsulating material has a higher melting temperature than the core, so that the core can be melted without melting the encapsulating material.

For another embodiment, the core is heated within the encapsulating material without substantially heating the encapsulating material by disposing magnetic particles, such as metal particles, within the core and exciting the particles with magnetic resonance.

Figure 21:
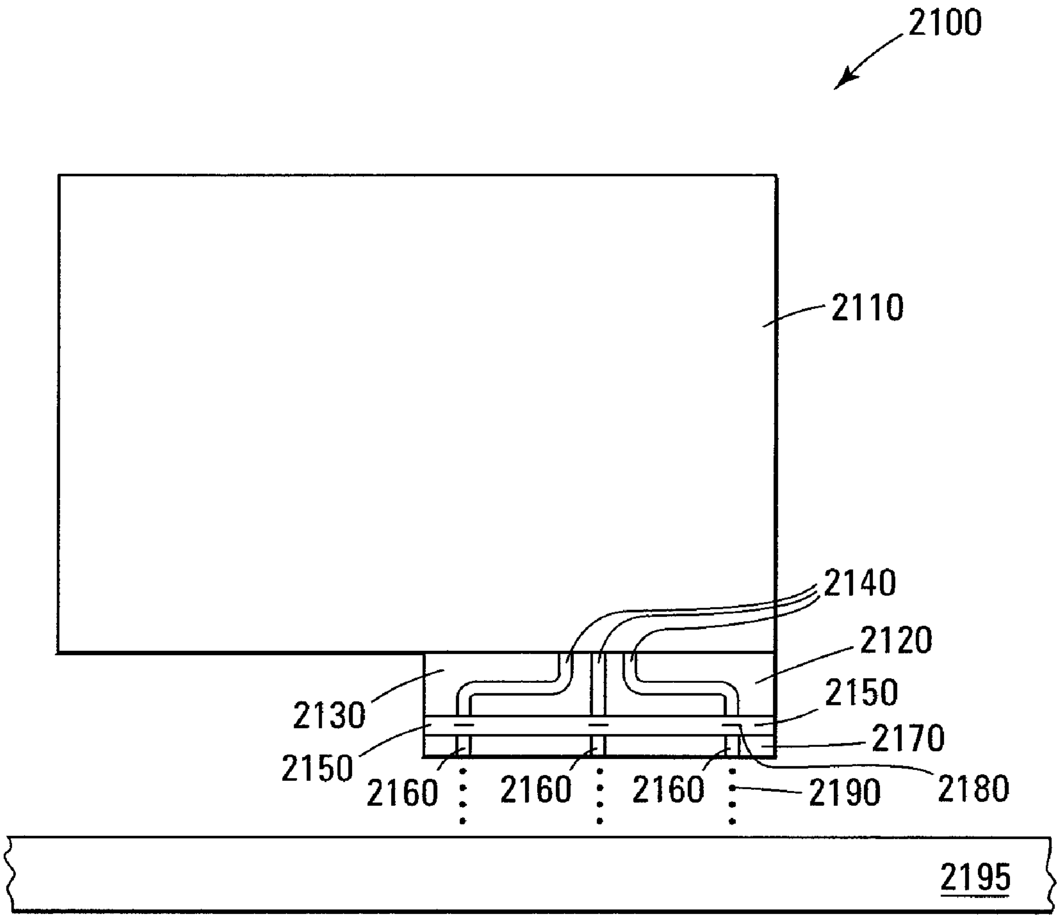
FIG. 21 illustrates a fluid-ejection cartridge according to another embodiment of the present invention.

FIG. 21 illustrates a fluid-ejection cartridge 2100, such as an ink-jet cartridge, according to another embodiment of the present invention. Fluid-ejection cartridge 2100 includes a fluid reservoir 2110, such as an ink reservoir, that for one embodiment is integral with a manifold 2120 of a fluid-ejection device 2130, e.g., a print head. Fluid-ejection device 2130 is capable of ejecting fluid, such as ink, onto media, such as paper. Manifold 2120 includes internal channels 2140, e.g., ink-delivery channels. For one embodiment, manifold 2120 and internal channels 2140 are formed according to the teachings of the present invention. Fluid-ejection device 2130 includes a fluid-ejecting substrate 2150, such as a print head die, disposed on manifold 2120, such as by gluing. Internal channels 2140 fluidly couple fluid reservoir 2110 to fluid-ejecting substrate 2150. Specifically, internal channels 2140 fluidly couple fluid reservoir 2110 to orifices 2160 of fluid-ejecting substrate 2150. For one embodiment, orifices 2160 are formed directly in fluid-ejecting substrate 2150 and constitute an orifice layer of fluid-ejecting substrate 2150. For another embodiment, orifices 2160 pass through an orifice plate 2170 disposed on fluid-ejecting substrate 2150. For another embodiment, resistors 2180 of fluid-ejecting substrate 2150 are fluidly coupled between internal channels 2140 and orifices 2160. For some embodiments, resistors 2180 are formed on fluid-ejecting substrate 2150 using semiconductor processing methods, as is well known in the art.

In operation, fluid reservoir 2110 supplies fluid, such as ink, to fluid-ejection device 2130. Internal channels 2140 deliver the fluid to fluid-ejecting substrate 2150. The fluid is channeled to resistors 2180. Resistors 2180 are selectively energized to rapidly heat the fluid, causing the fluid to be expelled through orifices 2160 in the form of droplets 2190. For some embodiments, droplets 2190 are deposited onto a medium 2195, e.g., paper, as fluid-ejection cartridge 2100 is carried over medium 2195 by a movable carriage (not shown) of an imaging device (not shown), such as a printer, fax machine, or the like.

Figure 22:
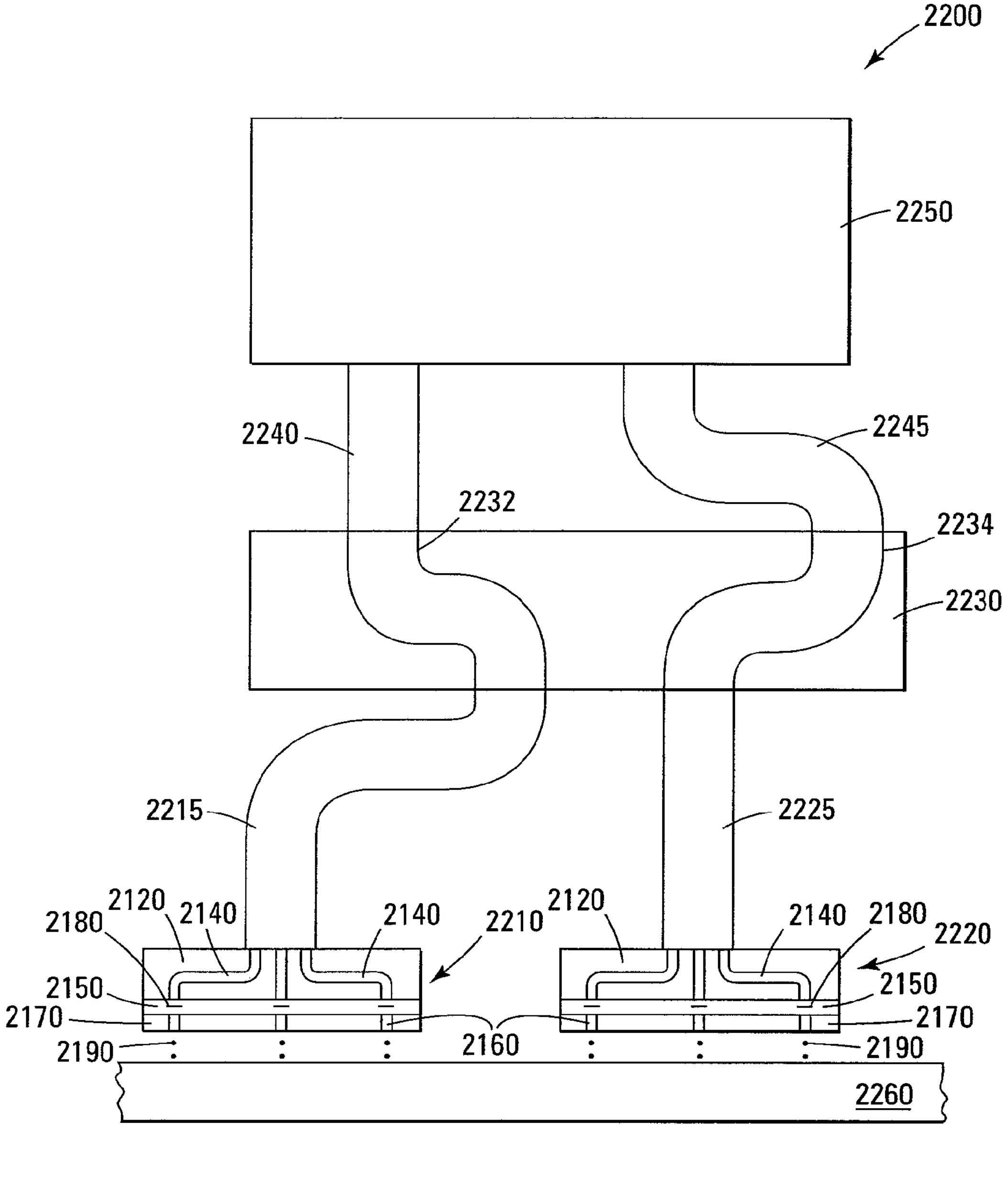
FIG. 22 illustrates a fluid-deposition system according to another embodiment of the present invention.

FIG. 22 illustrates a fluid-deposition system 2200, e.g., an ink deposition system, according to another embodiment of the present invention. For one embodiment, fluid-deposition system 2200 includes fluid-ejection devices 2210 and 2220, e.g., print heads, connected to a manifold 2230. For another embodiment, each of fluid-ejection devices 2210 and 2220 is constructed according to the present invention. For other embodiments, each of fluid-ejection devices 2210 and 2220 is as described above for fluid-ejection device 2130 of FIG. 21. For these embodiments, common reference numbers are used for each of fluid-ejection devices 2210 and 2220 and fluid-ejection device 2130 of FIG. 21.

For one embodiment, ducts 2215 and 2225 respectively fluidly couple fluid-ejection devices 2210 and 2220 to manifold 2230. Specifically, internal channels 2140 of manifolds 2120 of fluid-ejection devices 2210 and 2220 fluidly couple fluid-ejecting substrates 2150 of fluid-ejection devices 2210 and 2220 to ducts 2215 and 2225. Ducts 2215 and 2225 can either be flexible or substantially rigid. For another embodiment, ducts 2215 and 2225 are respectively fluidly coupled to internal channels 2232 and 2234 of manifold 2230. For another embodiment, manifold 2230 and internal channels 2232 and 2234 are formed according to the present invention. For some embodiments, ducts 2240 and 2245, e.g., either flexible or substantially rigid, fluidly couple manifold 2230 to a fluid reservoir 2250, e.g., an ink reservoir. Specifically, ducts 2240 and 2245 are respectively fluidly coupled to internal channels 2232 and 2234 of manifold 2230.

For one embodiment, manifold 2230 and fluid-ejection devices 2210 and 2220 are disposed on a movable carriage (not shown) of an imaging device (not shown), such as a printer, fax machine, or the like, while fluid reservoir 2250 is fixed to the imaging device remotely to manifold 2230 and fluid-ejection devices 2210 and 2220. For another embodiment, fluid-ejection devices 2210 and 2220 are fluidly coupled directly to manifold 2230 without using ducts 2215 and 2225. Specifically, fluid-ejection devices 2210 and 2220 are respectively fluidly coupled directly to internal channels 2232 and 2234 by manifolds 2120 of each of fluid-ejection devices 2210 and 2220.

During operation, for one embodiment, fluid droplets 2190, e.g., ink droplets, are deposited onto a medium 2260, e.g., paper, by fluid-ejection device 2210 and/or fluid-ejection device 2220 as fluid-ejection devices 2210 and 2220 are carried over medium 2260 by the movable carriage, while fluid reservoir 2250 remains stationary. For this embodiment, ducts 2240 and 2245 are flexible so as to enable fluid-ejection devices 2210 and 2220 to move relative to fluid reservoir 2250.

For another embodiment, manifold 2230 is fluidly coupled directly to fluid reservoir 2250 without using ducts 2240 and 2245. For this embodiment, fluid-ejection devices 2210 and 2220 are disposed on the movable carriage of the imaging device, while fluid reservoir 2250 and manifold 2230 are fixed to the imaging device remotely to fluid-ejection devices 2210 and 2220. For other embodiments, fluid reservoir 2250 delivers black ink to fluid-ejection device 2210 and colored ink to fluid-ejection device 2220.

For various embodiments, the manifolds and internal channels formed according to the present invention can be used in medical devices that are for delivering various medications to patients or that are used during the manufacture of medications.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method of manufacturing a fluid-ejection device, the method comprising:

forming at least one internal channel within an element of the fluid-ejection device, wherein forming the at least one internal channel comprises:

encapsulating at least one channel core in the element of the fluid-ejection device that corresponds to the at least one internal channel; and removing the at least one channel core; and fluidly coupling a fluid-ejecting substrate to the at least one internal channel.

2. The method of claim 1, wherein removing the at least one channel core comprises dissolving the at least one channel core.

3. The method of claim 1, wherein removing the at least one channel core comprises melting the at least one channel core by directing energy through the element and onto the channel core to heat channel core without substantially heating the element.

4. The method of claim 3, wherein directing energy through the element and onto the channel core to heat channel core without substantially heating the element comprises heating the channel core to a higher temperature than the element.

5. The method of claim 3, wherein directing energy through the element and onto the channel core comprises directing infrared, laser, ultrasonic, or magnetic energy through the element and onto the channel core.

6. The method of claim 3, wherein directing energy through the element and onto the channel core comprises magnetically exciting particles within the channel core.

7. The method of claim 1, wherein the element of the fluid-ejection device comprises a manifold of the fluid-ejection device and wherein encapsulating the at least one channel core in the element of the fluid-ejection device comprises:

forming a component of the manifold of the fluid ejection device, the component comprising a plurality of grooves;

forming the channel core in each of the grooves; and disposing a material on the component so as to encapsulate the channel cores.

8. The method of claim 7, wherein removing the least one channel core comprises dissolving the channel core from each of the grooves to form the internal channels that respectively correspond to the grooves.

9. The method of claim 7, wherein forming the component of the manifold comprises injection molding.

10. The method of claim 7, wherein forming the component of the manifold comprises forming a conduit at an end region of each of the grooves that extends from the end region.

11. The method of claim 10, wherein forming the channel core in each of the grooves comprises forming the channel core in the conduit at the end region of each of the grooves.

12. The method of claim 11, wherein disposing a material on the component so as to encapsulate the channel cores comprises disposing the material around the conduit so that the conduit passes completely through material.

13. The method of claim 12, wherein dissolving the channel core from each of the grooves to form the internal channels comprises dissolving the channel core in the conduit at the end region of each of the grooves.

14. The method of claim 7, wherein forming the component of the manifold comprises intersecting each of the grooves with a respective one of a plurality holes that pass completely though the component.

15. The method of claim 14, wherein forming the channel core in each of the grooves comprises forming the channel core in each of the holes.

16. The method of claim 15, wherein removing the least one channel core comprises:

dissolving the channel core from each of the grooves to form the internal channels that respectively correspond to the grooves; and dissolving the channel core in each of the holes.

17. The method of claim 7, wherein one or more of the plurality of grooves includes first and second internal surfaces that lie in different planes.

18. The method of claim 7, wherein forming a channel core comprises injecting a water-soluble material into each of the grooves.

19. The method of claim 7, wherein removing the at least one channel core comprises melting the at least one channel core by directing energy through the component and onto the channel core to heat channel core without substantially heating the material.

20. The method of claim 1, wherein the at least one channel core is removed while at least non-axially facing portions of the at least one channel core are completely encapsulated.

21. The method of claim 1, wherein the fluid-ejecting substrate comprises a print head die.

* * * * *